April 7, 1964   W. W. WATROUS, JR   3,128,409
FLOATING ELECTRODE FOR GASEOUS DISCHARGE DEVICE
Filed Oct. 17, 1960
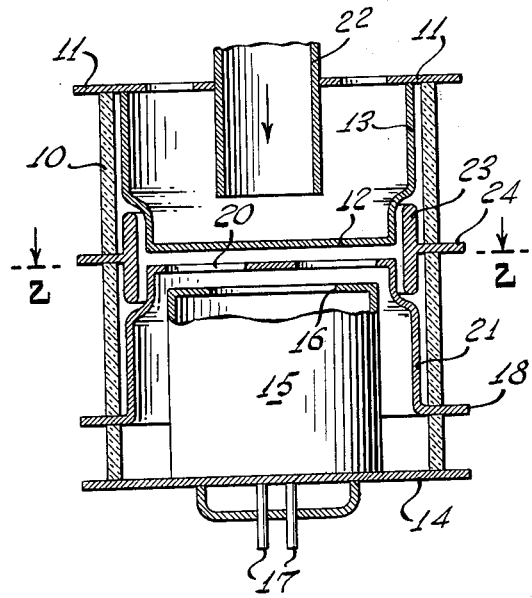
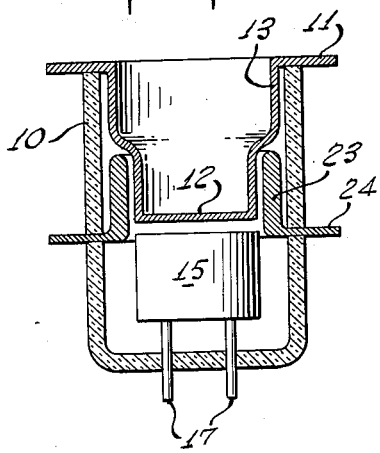
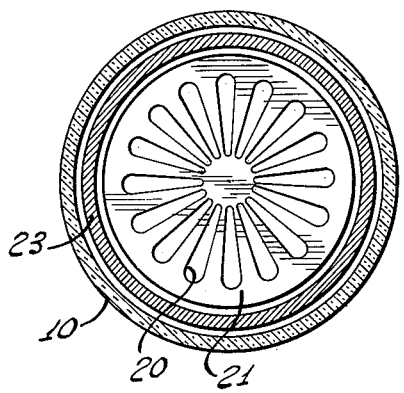
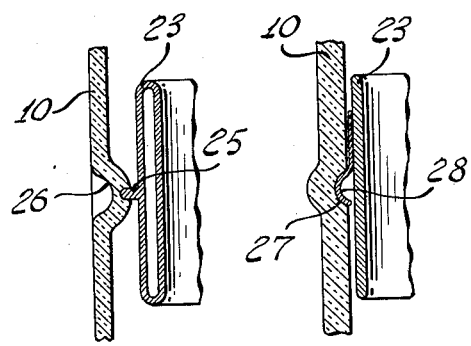
INVENTOR
Ward W. Watrous Jr.
BY
Eyre, Mann & Lucas
ATTORNEYS United States Patent Office 3,128,409
Patented Apr. 7, 1964

3,128,409
FLOATING ELECTRODE FOR GASEOUS
DISCHARGE DEVICE
Ward W. Watrous, Jr., Chatham, N.J., assignor to Tung-Sol Electric Inc., a corporation of Delaware
Filed Oct. 17, 1960, Ser. No. 63,107
8 Claims. (Cl. 313—188)

This invention relates to a floating electrode for high voltage gaseous discharge devices which reduces the tendency to form arcs between electrodes and which reduces leakage across the envelope adjacent to the electrodes.

Gaseous discharge devices of both the diode and thyratron planar type generally contain electrodes adjacent to the envelope having edges where glow or spark discharges are likely to occur. These discharges start from a cathode spot and may develop into arc discharges which cause failure. In cases where immediate failure does not occur, metallic films are sputtered onto portions of an insulating envelope. The sputtered material produces leakage currents, altering the shape of the electric field and, in time, produce arc discharges which will fracture the insulating material of the envelope wall. The present invention eliminates these difficulties by providing a barrier which greatly reduces the amount of sputtered material reaching the insulating envelope. The barrier is conducting but is not connected to any portion of the tube circuit and floats at a potential which is about halfway between the potentials of the two electrodes adjacent to it. This floating electrode not only prevents the deposition of sputtered material but also reduces the possibility of cathode spot formation and subsequent arcing.

One of the objects of this invention is to provide an improved gaseous discharge device which avoids one or more of the disadvantages and limitations of prior art arrangements.

Another object of the invention is to prevent the formation of arcs from the edges of electrodes in a gaseous discharge device.

Another object of the invention is to reduce leakage currents between electrodes in a thyratron.

Another object of the invention is to reduce the electric field which ordinarily is present between electrodes near an insulating envelope.

Another object of the invention is to reduce the formation of cathode spots in a discharge device.

Another object of the invention is to reduce the deposition of sputtered material on the inner walls of the tube envelope, the formation of which causes an undesirable alteration of the shape of the electric field between tube electrodes.

Another object of the invention is to reduce the energy in the arc if a cathode spot does appear. With the floating electrode in place the arc energy is determined by the small charge in this electrode.

The invention comprises a gaseous discharge device which includes an envelope containing gas at a reduced pressure together with a plurality of current carrying electrodes and a floating electrode. The floating electrode is formed in the shape of a hollow cylinder and is positioned adjacent to at least two of the current carrying electrodes. The floating electrode is secured to an insulating portion of the discharge device near the inside surface of the envelope.

For a better understanding of the present invention, together with other and further objects thereof, reference is made to the following description taken in connection with the accompanying drawings.

FIG. 1 is a cross sectional view of a gaseous discharge device containing a floating electrode.

FIG. 2 is a sectional view of the device shown in FIG. 1 and is taken along line 2—2 of that figure.

FIG. 3 is a rectifier tube having only an anode, a cathode, and a floating electrode within an insulating envelope.

FIG. 4 is a cross sectional view showing a portion of a floating electrode secured to the envelope by an alternate means.

FIG. 5 is a cross sectional view similar to FIG. 4 but showing another means of securing the electrode.

Referring now to FIGS. 1 and 2 the discharge device includes an envelope 10 which may be made of glass or ceramic material. At one end of the device a flange 11 is secured to the envelope and supports an anode discharge disc 12 having a cylindrical supporting means 13. At the other end of the device a flange 14 supports a cathode 15 which discharges electrons through an aperture 16. Lead-in conductors 17 are sealed through a portion of the envelope to provide heater current for the cathode.

Intermediate the two ends of the envelope a third flange 18 supports a perforate grid 20 positioned between the cathode discharge orifice 16 and the anode disc 12. The grid 20 is supported by a cylindrical member 21. The device shown in FIG. 1 includes a conduit 22 for forcing air or other fluid into one end of the tube for cooling the anode disc but this construction is not necessary and does not form any part of the invention.

A floating electrode 23 is positioned on the inside of the envelope and in close proximity to the inside surface of the envelope. The floating electrode as shown in FIG. 1 is supported by a flange 24 which is sealed to portions of the envelope and is held securely in the position shown. The floating electrode 23 is formed in the shape of a hollow cylinder and encloses the discharge space between the grid 20 and the anode disc 12. The envelope is filled with gas at a reduced pressure which may be ionized and conduct current between the electrodes.

The operation of the device of FIGS. 1 and 2 is as follows: When the grid 20 is made positive and fires the tube, an electrical discharge is created and current flows between the cathode 15 and the anode 12. During this discharge the gas surrounding the floating electrode is ionized and made conducting and therefore the floating electrode assumes a potential which is approximately equal to the arc drop voltage. During the discharge portion of the cycle the floating electrode has practically no effect on the operation of the device.

During that portion of the cycle when the tube is not conducting, a large negative or positive potential may be applied to the anode and during this hold off period there is a tendency for cathode spots to form on the surface of all the negative electrodes.

Glow discharges start from these spots and eventually may form arcs which produce current in the wrong direction during that portion of the cycle when the device should be nonconductive. With the floating electrode in the tube as indicated, and having a potential about half way between the potentials of the grid and anode, there is little tendency to form arcs near the edges of these electrodes. If arcs do form between either one of the other electrodes and the floating electrode the energy of the arc is very small because the only current possible is the current necessary to discharge the capacity of the floating electrode. The only opportunity for a substantial current-carrying arc to form is when a cathode spot is formed on both sides of the floating electrode and at the same time. There will then be two arcs in series, one to the anode and one to the grid. The occurrence of simultaneous cathode spots is highly improbable.

The normal discharge between the cathode 15 and the anode 12 causes considerable sputtering of metallic particles. In tubes without the floating electrode this sputtering action deposits a film on the inside surface of the electrode and produces leakage currents and field distortion. With the floating electrode in the tube, the sputtering action deposits a metallic film on the inside surface of the floating electrode and no harm results.

The gaseous discharge device shown in FIG. 3 is a diode rectifier and is similar to the device shown in FIGS. 1 and 2 except that it has no grid. The action of the floating electrode 23 is the same as that described above.

It is generally convenient to secure the floating electrode 23 to a circular flange 24 which is then sealed into the envelope as shown in FIGS. 1, 2 and 3. However, it is not necessary to project the flange 24 beyond the outside surface of the envelope and the constructions shown in FIGS. 4 and 5 illustrate alternative methods of securing the floating electrode. In FIG. 4, a short flange 25 is provided and the floating electrode is inserted into the envelope in the desired position. Then a portion 26 of the glass envelope is heated and forced into contact with flange 25 as shown in this figure. This secures the floating electrode without any conducting material extending beyond the surface of the envelope. The floating electrode 23 may be hollow as shown in this figure.

FIG. 5 shows another means of securing the floating electrode 23. The envelope 10 is formed with an annular recess 27 and the floating electrode 23 carries a plurality of spring members 28 which are welded or otherwise secured to the outside surface of the electrode. During the construction of the discharge device it is only necessary to slide the floating electrode into the tube and the spring members will snap into the recess and hold the electrode in position without any heating or welding to glass.

It is assumed that all electrode spacings, from each other and from the glass envelope, are smaller than the mean free path of electrons at the gas pressure used.

From the above description it will be evident that a high voltage gas filled discharge device containing a floating electrode will operate with exceptional reliability.

The foregoing disclosure and drawings are merely illustrative of the principles of this invention and are not to be interpreted in a limiting sense. The only limitations are to be determined from the scope of the appended claims.

What is claimed is:

1. A gaseous discharge device comprising; an insulating envelope containing gas at a reduced pressure; an anode, a cathode, a firing electrode, and an electrically floating electrode also within said envelope; said floating electrode positioned adjacent to the anode and the firing electrode and near the inside surface of the envelope; and insulating securing means for holding the floating electrode in position.

2. A gaseous discharge device comprising; an insulating envelope containing gas at a reduced pressure; an anode, a cathode, a firing electrode, and an electrically floating electrode also within said envelope; said anode and firing electrode formed with cylindrical side walls for supporting discharge elements; said floating electrode positioned adjacent to the side walls of the anode and firing electrode, and near the inside surface of the envelope; and insulating securing means for holding the floating electrode in position.

3. A gaseous discharge device comprising; an insulating envelope containing gas at a reduced pressure; an anode, a cathode, and an electrically floating electrode also within said envelope; said floating electrode positioned adjacent to the anode and the cathode and near the inside surface of the envelope; and insulating securing means for holding the floating electrode in position.

4. A gaseous discharge device comprising; an insulating envelope containing gas at a reduced pressure; an anode, a cathode, and an electrically floating electrode also within said envelope; said anode and cathode formed with cylindrical walls for supporting discharge elements; said floating electrode positioned adjacent to said side walls of the anode and cathode and near the inside surface of the envelope; and insulating securing means for holding the floating electrode in position.

5. A gaseous discharge device as set forth in claim 4 wherein said floating electrode is formed as a hollow cylinder with its ends rounded to prevent electric discharges from sharp edges.

6. A gaseous discharge device as set forth in claim 4 wherein said floating electrode is formed with a circular flange on its outside surface and this flange is sealed to a portion of the insulated envelope.

7. A gaseous discharge device comprising; an insulating envelope containing gas at a reduced pressure; said envelope also containing an anode, a cathode, at least one control electrode for starting conduction, and an electrically floating electrode; the control electrode adjacent the cathode formed with cylindrical side walls which support a perforate plate and partially enclose the cathode structure; the anode also formed with cylindrical side walls for supporting an anode discharge plate, said floating electrode positioned adjacent to said walls of the anode and control electrode and near the inside surface of the envelope; said floating electrode including a circular flange on its outside surface and sealing means for securing said flange to the insulated envelope.

8. A gaseous discharge device comprising: an insulating envelope containing an ionizable gas at a reduced pressure; an anode, a cathode, and an electrically floating electrode also within said envelope; said anode and cathode formed with cylindrical walls for supporting discharge elements; said floating electrode positioned adjacent to said side walls of the anode and cathode and near the inside surface of the envelope; said floating electrode adapted to assume a potential substantially midway between the potential of the anode and cathode when the gas is ionized; and insulating means for holding the floating electrode in position.

References Cited in the file of this patent

UNITED STATES PATENTS 1,987,328    Eitel et al.    Jan. 8, 1935

FOREIGN PATENTS 907,089    Germany    Mar. 22, 1954